US010725935B2

(12) United States Patent
Barbu et al.

(10) Patent No.: US 10,725,935 B2
(45) Date of Patent: Jul. 28, 2020

(54) METHOD FOR WRITING IN A NON-VOLATILE MEMORY OF AN ELECTRONIC ENTITY, AND RELATED ELECTRONIC ENTITY

(71) Applicant: IDEMIA FRANCE, Colombes (FR)

(72) Inventors: Guillaume Barbu, Colombes (FR); Philippe Andouard, Colombes (FR)

(73) Assignee: IDEMIA FRANCE, Colombes (FR)

(*) Notice: Subject to any disclaimer, the term of this patent is extended or adjusted under 35 U.S.C. 154(b) by 187 days.

(21) Appl. No.: 16/062,558

(22) PCT Filed: Dec. 15, 2016

(86) PCT No.: PCT/FR2016/053456
§ 371 (c)(1),
(2) Date: Jun. 14, 2018

(87) PCT Pub. No.: WO2017/103497
PCT Pub. Date: Jun. 22, 2017

(65) Prior Publication Data
US 2018/0373648 A1 Dec. 27, 2018

(30) Foreign Application Priority Data
Dec. 15, 2015 (FR) ...................... 15 62376

(51) Int. Cl.
G06F 21/00 (2013.01)
G06F 12/14 (2006.01)
(Continued)

(52) U.S. Cl.
CPC .......... G06F 12/1408 (2013.01); G06F 21/55 (2013.01); G06F 21/70 (2013.01);
(Continued)

(58) Field of Classification Search
CPC ........ G06F 21/75; G06F 21/755; G06F 21/70; G06F 21/71; G06F 21/72; G06F 21/74;
(Continued)

(56) References Cited

U.S. PATENT DOCUMENTS 8,477,933 B2   7/2013  Vigilant et al.
8,555,390 B2  10/2013  Thiebeauld De La Crouee et al.
(Continued)

FOREIGN PATENT DOCUMENTS

EP   2 164 031 A1   3/2010
EP   2 180 631 A1   4/2010
(Continued)

OTHER PUBLICATIONS

Veyrat-Charvillon et al., "Shuffling against Side-Channel Attacks: A comprehensive Study with Cautionary Note", Correct System Design, Lecture Notes in Computer Science, 2012, pp. 740-757.
(Continued)

Primary Examiner — Edward Zee
(74) Attorney, Agent, or Firm — Young & Thompson

(57) ABSTRACT

Disclosed is a method for writing in a non-volatile memory of an electronic entity, the method including the following steps: determining an operational state of the electronic entity; writing a first datum in a first area of the non-volatile memory in case of abnormal operation; writing a second datum in a second area of the non-volatile memory in case of normal operation. The method includes a step for randomly determining a location for the second area from among a plurality of locations for the second area, the writing of the datum in the second area being carried out in the determined location. Also disclosed is a related electronic entity.

20 Claims, 1 Drawing Sheet

Figure 1:
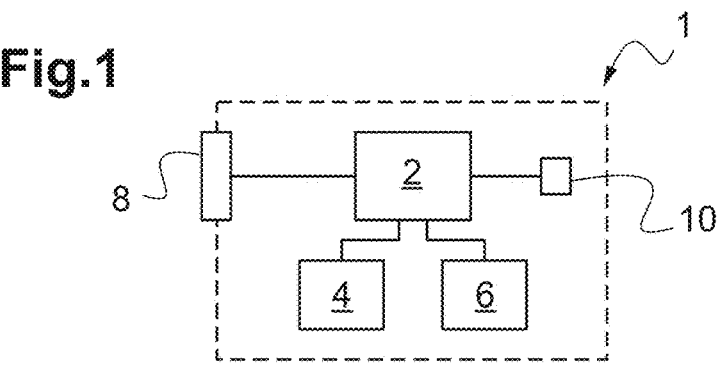

(51) Int. Cl.
*G06F 21/79* (2013.01)
*G06F 21/75* (2013.01)
*G06F 21/70* (2013.01)
*G06F 21/71* (2013.01)
*G06F 21/55* (2013.01)
*G06F 21/72* (2013.01)

(52) U.S. Cl.
CPC .............. *G06F 21/71* (2013.01); *G06F 21/72* (2013.01); *G06F 21/75* (2013.01); *G06F 21/755* (2017.08); *G06F 21/79* (2013.01); *G06F 2212/1052* (2013.01)

(58) Field of Classification Search
CPC ......... H04L 9/062; H04L 9/003; H04L 9/004; H04L 9/005
See application file for complete search history.

(56) References Cited

U.S. PATENT DOCUMENTS

| | | | | |
|---|---|---|---|---|
| 8,892,903 | B1* | 11/2014 | Trimberger | G09C 1/00 713/189 |
| 2009/0113217 | A1 | 4/2009 | Dolgunov et al. | |
| 2010/0064370 | A1* | 3/2010 | Thiebeauld de la Crouee | G06K 19/07363 726/24 |
| 2010/0299511 | A1 | 11/2010 | Pelletier et al. | |
| 2011/0128030 | A1 | 6/2011 | Wuidart | |
| 2011/0145595 | A1 | 6/2011 | Kim et al. | |
| 2012/0246489 | A1* | 9/2012 | Brelot | G06F 9/384 713/193 |
| 2012/0331309 | A1 | 12/2012 | Scott et al. | |
| 2013/0145177 | A1 | 6/2013 | Cordella et al. | |
| 2013/0219522 | A1 | 8/2013 | Chamberot | |

FOREIGN PATENT DOCUMENTS

| | | |
|---|---|---|
| EP | 2 215 580 B1 | 2/2012 |
| EP | 1 779 284 B1 | 3/2014 |
| FR | 3 011 650 A1 | 4/2015 |

OTHER PUBLICATIONS

International Search Report, dated Apr. 25, 2017, from corresponding PCT application No. PCT/FR2016/053456.

* cited by examiner

METHOD FOR WRITING IN A NON-VOLATILE MEMORY OF AN ELECTRONIC ENTITY, AND RELATED ELECTRONIC ENTITY

TECHNICAL FIELD TO WHICH THE INVENTION IS RELATED

The present invention concerns the protection of electronic entities against attacks.

It concerns more particularly a method of writing in a non-volatile memory of an electronic entity and a related electronic entity.

The invention particularly advantageously applies in the case where provision is made to write a datum representative of a type of error in the non-volatile memory when an operating anomaly is detected.

TECHNOLOGICAL BACKGROUND

A method of writing in a non-volatile memory of an electronic entity is known from document EP 2 164 031 comprising the following steps:
  determining an operating state of the electronic entity;
  in the event of abnormal operation, writing a first datum in a first area of the non-volatile memory;
  in the event of normal operation, writing a second datum in a second area of the non-volatile memory.

Writing the first datum in the first area of the non-volatile memory makes it possible to keep track of the detection of abnormal operation and optionally lead to locking the operation of the electronic entity, e.g. when a predetermined number of operating anomalies has been detected in the course of the successive operating phases of the electronic entity.

Writing the second datum in the second area of the non-volatile memory is aimed at simulating the above-mentioned writing in the first area, so that an attacker cannot distinguish cases of anomaly detection from cases of normal operation. Indeed the attacker seeks to detect such anomaly detection by the electronic entity in order to prevent the writing of the first datum and thereby avoid locking the electronic entity.

In line with this, document EP 2 164 031 teaches that writing in the first area and writing in the second area must have an identical signature with regard to their electrical consumption.

SUBJECT MATTER OF THE INVENTION

In this context, the present invention provides a method of writing as defined above, characterized by a step of randomly determining a location of the second area from among a plurality of locations of the second area, said writing of the datum in the second area being carried out at the determined location.

The inventors have indeed found that writing in the first area and writing in the second area could produce different observable signals (electrical or electromagnetic), in particular when low-level routines of writing in non-volatile memory are designed without taking into account the intention to produce constant observable signals.

It is therefore provided here to cause writing to a different location each time (in the second area) during normal operation.

Thus, the observable difference between writing in the first area and writing in the second area will be of the same order as the observable differences between successive writings in the second area (at different locations each time) during normal operation so that an attacker will not be able to detect the writing in the first area (with the object of disrupting this writing).

Such a method of writing forms, for example, part of a data processing method comprising the following steps:
  receiving a datum via a communication interface;
  processing the datum received.

According to other optional (and therefore non-restrictive) features:
  the processing is a cryptographic processing and/or uses a cryptographic key stored in the non-volatile memory;
  the step of determining the operating state comprises a verification of a result obtained by said processing;
  the step of determining the operating state uses an attack detector;
  the size of the second area is greater than or equal to the size of the first area;
  the size of the first area is equal to the size of the second area;
  the first datum is representative of a type of error.

The invention also provides an electronic entity comprising a non-volatile memory, a module for determining an operating state of the electronic entity, and a module for writing in non-volatile memory designed for writing a first datum in a first area of the volatile memory in the event of abnormal operation (i.e. when a risk of attack is detected) and for writing a second datum in a second area of the volatile memory in the event of normal operation (i.e. in the absence of detection of a risk of attack), characterized in that the module for writing in non-volatile memory is designed for randomly determining a location of the second area from among a plurality of locations of the second area and for writing the second datum in the second area at the determined location.

Such an electronic entity comprises, for example, a module for reading in non-volatile memory designed for reading data in the first area and a locking mechanism capable of selectively locking the operation of the electronic entity according to the data read.

When the electronic entity comprises a processor (e.g. a microprocessor), the above-mentioned modules and mechanism may be implemented by electronic components and/or as a result of the execution by the processor, of computer program instructions stored in a memory (e.g. the aforementioned non-volatile memory) of the electronic entity.

Furthermore, the optional features described above in terms of method may optionally be applied to such an electronic entity.

DETAILED DESCRIPTION OF AN EMBODIMENT

The following description with reference to the appended drawings, given by way of non-restrictive examples, will elucidate what the invention involves and how it may be implemented.

Figure 2:
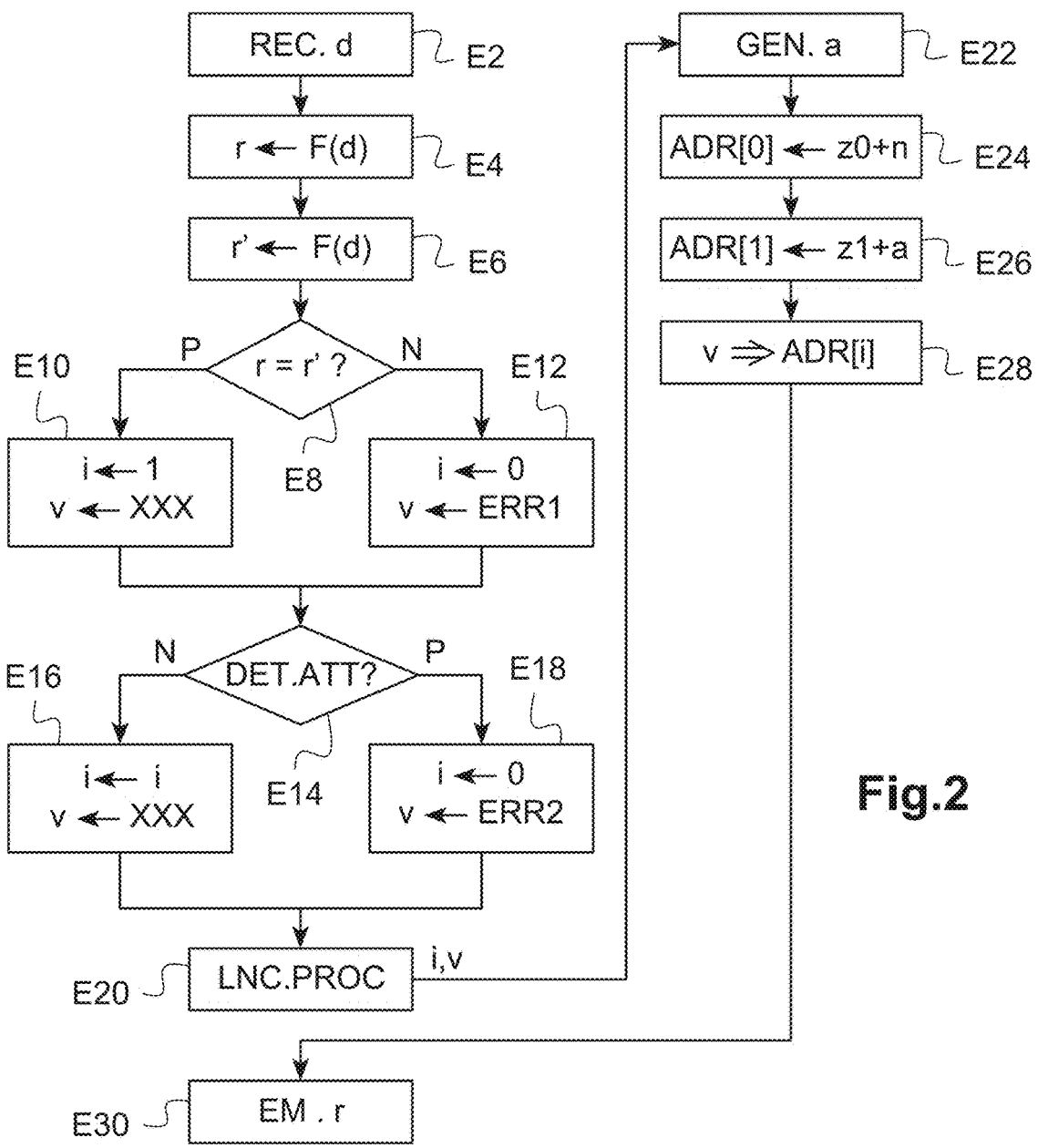

In the appended drawings:

FIG. 1 schematically represents the main elements of an electronic entity within which the invention is implemented; and FIG. 2 is a flow diagram depicting the steps of a method implemented within the electronic entity in FIG. 1.

FIG. 1 schematically represents the main elements of an electronic entity 1 within which the invention is implemented.

This electronic entity is, for example, a microcircuit card, such as a Universal Integrated Circuit Card (or UICC). As a variant, it could be a Secure Element (or SE)—e.g. a secure microcontroller, a hand-held electronic device—e.g. a communication terminal or an electronic passport, or a computer.

The electronic entity 1 comprises a microprocessor 2, a random access memory 4 and a non-volatile memory 6. The electronic entity 1 could optionally further comprise a read-only memory.

The non-volatile memory 6 is, for example, a rewritable non-volatile memory (e.g. of the EEPROM or "Electrically Erasable and Programmable Read-Only Memory" type, or Flash type), or a write-once non-volatile memory (e.g. of the OTP or "One-Time Programmable" type).

The random access memory 4 and the non-volatile memory 6 (and where appropriate the read-only memory) are each linked to the microprocessor 2 so that the microprocessor 2 may read or write data in each of these memories.

One of these memories, e.g. the non-volatile memory 6, stores the computer program instructions which allow the implementation within the electronic entity 1, of a method (such as, for example, the method described below with reference to FIG. 2) when these instructions are executed by the microprocessor 2. In the example described here, these instructions notably comprise instructions of a main program (which corresponds to steps E2 to 20 and E30 of FIG. 2) and instructions of a subroutine (which corresponds to steps E22 to E28 in FIG. 2).

The memories 4, 6 also store data representative of variables used during the implementation of various data processing methods, notably the method described below with reference to FIG. 2.

The non-volatile memory 6 further comprises a security writing area Z0 and a systematic writing area Z1 used as described below. In the embodiment described here, the security writing area Z0 and the systematic writing area Z1 have an identical size, e.g. between 2 bytes and a predetermined value depending on the security policy.

The security writing area Z0 and the systematic writing area Z1 as a variant could, however, have respective sizes different from each other. In a particular case, the security writing area Z0 could be limited to 1 byte. The systematic writing area Z1 in turn comprises at least 2 bytes (i.e. at least two locations). The length (in bytes) of the systematic writing area Z1 is denoted by L.

When starting up the operation of the electronic entity 1 (e.g. following its power-up), the microprocessor 2 reads the data stored in the security writing area Z0 and may selectively, according to the data read, lock its operation or continue its operation, e.g. by implementing the method described below with reference to FIG. 2.

Locking the operation of the electronic entity 1 is, for example, carried out when the microprocessor 2 reads in the security writing area Z0 a byte having a predetermined value (called the "locking datum" or "lock"). As a variant, locking the operation of the electronic entity 1 may be carried out when the microprocessor 2 reads in the security writing area Z0 a predetermined number of data (e.g. of bytes) each corresponding to an error code (stored during previous operating phases of the electronic entity 1 as described below within the framework of the method described with reference to FIG. 2). In this last case it is provided, for example, that at each start-up of the operation of the electronic entity 1, the microprocessor 2 reads the bytes stored in the security writing area Z0 so as to determine the number n of these bytes that correspond to an error code: the number n is stored in random access memory 4 (see its use in step E24 described below) and the microprocessor 2 causes the operation of the electronic entity 1 to be locked when this number n reaches (or exceeds) a predetermined threshold.

In some cases, locking the operation of the electronic entity 1 may be accompanied by other protection measures, e.g. deleting some data at least stored in the non-volatile memory 6.

The electronic entity 1 further comprises a communication interface 8 with external electronic devices. In the case described here where the electronic entity 1 is a microcircuit card, the communication interface 8 comprises, for example, contacts surfacing on one face of the microcircuit card. As a variant, the communication interface 8 could take the form of a contactless communication module. In general, the communication interface 8 may be a (wired or wireless) communication module with another electronic entity.

The microprocessor 2 may thus receive data d originating from the other electronic entity via the communication interface 8, process these data d by means of a processing algorithm (e.g. a cryptographic algorithm) in order to obtain a result r, and transmit this result r to the other electronic entity via the communication interface 8.

The electronic entity 1 also comprises an attack detector 10; one such attack detector 10 is, for example, a light sensor or, as a variant, a power supply disruption detector. In general, it is a hardware component designed for detecting attacks in the course of which an attacker seeks to cause an operating anomaly in the electronic entity, e.g. by directing a laser beam onto the electronic entity 1 (attack detectable by means of the aforementioned light sensor) or by disrupting the electrical power supply of the components within the electronic entity 1.

FIG. 2 represents, in the form of a flow diagram, an example of a method in conformity with the invention.

This method starts in step E2 in which the microprocessor 2 receives data d via the communication interface 8.

The microprocessor 2 then proceeds in step E4 to processing the received data d. Such processing consists, for example, in applying a cryptographic algorithm to the data d using a cryptographic key stored in the non-volatile memory 6.

The data obtained by the processing in step E4 is designated by r:

r=F(d), where F is the function implemented by the processing in step E4.

It is further provided here in step E6 to repeat the processing performed in step E4 to ensure that this processing was carried out without any anomaly.

In other words, in step E6 the microprocessor performs a processing identical to that performed in step E4 (here the application of the above-mentioned cryptographic algorithm to the data d using the aforementioned cryptographic key).

The data obtained by the processing in step E6 is designated by r':

$r'=F(d)$.

In normal operation (i.e. notably when no attack by fault generation has taken place), the data r and the data r' are identical; this is not the case on the other hand if an anomaly has occurred in the course of step E4 or step E6 (an anomaly which may be generated by a fault attack).

Thus in step E8 it is tested whether the data r and the data r' are identical.

It is noted that as a variant, the repetition of the processing of step E4 (step E6) could be replaced by the application to the data r of processing that is the reverse of that carried out in step E4; the data d' thus obtained (d'=F$^{-1}$(r)) are in this case compared with the data d (by replacing the test in step E8) for verifying normal operation.

If it is determined in step E8 that the data r and the data r' are identical (arrow P), the microprocessor 2 sets (step E10) a variable i to the value 1 and a variable v to any value (denoted by XXX in FIG. 2), e.g. a predefined value.

The method then continues to step E14 described below.

If it is determined in step E8 that the data r and the data r' are not identical (which is the case if an anomaly occurred in the course of step E4 or E6), the microprocessor 2 sets (step E12) a variable i to the value 0 and a variable v to a predetermined value ERR1 representative of a first type of error.

The method continues to step E14 step in which the microprocessor 2 determines whether an attack has been detected by the attack detector 10.

If so (arrow P), the microprocessor 2 sets (step E18) a variable i to the value 0 and a variable v to a predetermined value ERR2 representative of a second type of error. The method then continues to step E20 described below.

If not (arrow N), the microprocessor 2 stores in the variable i the value previously stored in this variable and sets a variable v to any value, e.g. a predefined one (step E16).

It is noted that storing in the variable i the previously stored value in this same variable in the end has no effect on the content of the variable i; this operation, however, makes it difficult for an attacker to distinguish, by external observations of the operation of the electronic entity 1, the case where an attack has been detected (i.e. of the operation in the event of attack) from the case of normal operation (operation in the absence of attack).

The method also continues in this case with step E20.

The microprocessor 2 in step E20 launches a process of writing the value contained in the variable v either in the systematic writing area Z1, or in the security writing area Z0.

In the example described here, this process is implemented as result of the execution of a subroutine represented in steps E22 to E28. The respective values of the variable i and of the variable v are passed as parameters when calling this subroutine, as represented schematically in FIG. 2.

As a result of execution of this subroutine, the microprocessor 2 in step E22 generates a random number between 0 and L−1, where L is as already stated the length (in bytes) of the systematic writing area Z1. As a variant, the microprocessor 2 may receive such a random number originating from a cryptoprocessor with which the electronic entity 1 is provided.

The microprocessor 2 then stores (step E24), in a first cell ADR[0] of an array ADR (stored, for example, in random access memory 4), a value z0+n designating an address within the security writing area Z0 (or, in other words, the address of a location of the security writing area Z0), where z0 denotes the address (of the first location) of the security writing area Z0 and n denotes the number of bytes already written in the secure area during previous operating phases of the electronic entity 1 (the number n being, for example, determined at the start-up of the operation of the electronic entity 1 and stored in random access memory 4 as described above).

The microprocessor 2 also stores (step E26), in a second cell ADR[1] of the array ADR, a value z1+a designating a randomly chosen address within the systematic writing area Z1 (or, in other words, the address of a location randomly chosen from among the L locations in the systematic writing area Z1), where z1 denotes the address (of the first location) of the systematic writing area Z1.

The microprocessor 2 in step E28 then orders the value v to be written in the non-volatile memory 6 at the address designated by the value stored in the cell ADR[i]: the value v is written in the non-volatile memory 6 at the address stored in the first cell ADR[0] of the array ADR if the variable i is equal to 0, or else to the address stored in the second cell ADR[1] of the array ADR if the variable i is equal to 1. Furthermore, it may be provided that, when the variable i is equal to 0, the microprocessor 2 increments the number n mentioned above (stored in random access memory 4).

Thus, if it has been determined in the course of steps E8 and E14 that a risk of attack was present (in which case the variable i has been set to 0 in step E12 or in step E18), step E28 causes the writing of a value representative of a type of error in the security writing area Z0.

In other cases (i.e. in normal operation and therefore, a priori, in the absence of attack), step E28 causes the writing of any value in the systematic writing area Z1, at a location randomly determined each time from among the various locations of the systematic writing area Z1.

Thus, the electrical and/or electromagnetic signals generated during this writing and observable by an attacker vary from one writing to another in the systematic writing area Z1.

The implementation of a writing in the security writing area Z0 would cause a variation in the observable signals of the same order and could not therefore be distinguished from writings in the systematic writing area Z1 by an attacker, who thus could not disrupt (e.g. by switching off the electrical power supply of the electronic entity 1) the writing in the security writing area Z0.

The representative values of a type of error (capable of leading to the locking of the electronic entity 1) are thus correctly written in the security writing area Z0.

Once the writing in non-volatile memory has been performed in step E28, the process launched in step E20 is finished and the method continues (here by returning to the main program) at step E30, at which the electronic entity 1 transmits, for example, the result r obtained in step E4 via the communication interface 8.

The invention claimed is:

1. A method of writing in a non-volatile memory of an electronic entity, the method comprising:
    performing a processing;
    testing whether the processing was carried out without any anomaly or with an anomaly;
        when the processing was carried out with the anomaly, writing a first datum in a first area of the non-volatile memory;
        when the processing was carried out without any anomaly, writing a second datum in a second area of the non-volatile memory;
    wherein the method further comprises randomly determining a location of the second area from among a plurality of locations of the second area, and
    wherein said writing of the second datum in the second area is carried out at the determined location.

2. The method of writing as claimed in claim 1, further comprising:
    receiving an initial datum via a communication interface
    wherein performing the processing includes processing the received initial datum.

3. The method of writing as claimed in claim 2, wherein the processing is a cryptographic processing.

4. The method of writing as claimed in claim 2, wherein the processing uses a cryptographic key stored in the non-volatile memory.

5. The method of writing as claimed in claim 2, wherein the testing whether the processing was carried out without any anomaly or with the anomaly comprises verifying a result obtained by said processing.

6. The method of writing as claimed in claim 1, wherein the testing whether the processing was carried out without any anomaly or with the anomaly uses an attack detector.

7. The method of writing as claimed in claim 1, wherein the size of the second area is greater than or equal to the size of the first area.

8. The method of writing as claimed in claim 1, wherein the first datum is representative of a type of error.

9. The method of writing as claimed in claim 3, wherein the processing uses a cryptographic key stored in the non-volatile memory.

10. The method of writing as claimed in claim 3, wherein the testing whether the processing was carried out without any anomaly or with the anomaly comprises verifying a result obtained by said processing.

11. The method of writing as claimed in claim 4, wherein the testing whether the processing was carried out without any anomaly or with the anomaly comprises verifying a result obtained by said processing.

12. The method of writing as claimed in claim 2, wherein the testing whether the processing was carried out without any anomaly or with the anomaly uses an attack detector.

13. The method of writing as claimed in claim 3, wherein the testing whether the processing was carried out without any anomaly or with the anomaly uses an attack detector.

14. The method of writing as claimed in claim 4, wherein the testing whether the processing was carried out without any anomaly or with the anomaly uses an attack detector.

15. The method of writing as claimed in claim 5, wherein the testing whether the processing was carried out without any anomaly or with the anomaly uses an attack detector.

16. The method of writing as claimed in claim 2, wherein the size of the second area is greater than or equal to the size of the first area.

17. The method of writing as claimed in claim 3, wherein the size of the second area is greater than or equal to the size of the first area.

18. The method of writing as claimed in claim 4, wherein the size of the second area is greater than or equal to the size of the first area.

19. An electronic entity comprising:
a non-volatile memory;
at least one processor configured to
test whether a processing was carried out without any anomaly or with an anomaly and
write a first datum in a first area of the non-volatile memory when the processing was carried out with the anomaly and write a second datum in a second area of the non-volatile memory when the processing was carried out without any anomaly,
wherein the at least one processor is configured to randomly determine a location of the second area from among a plurality of locations of the second area, and to write the second datum in the second area at the determined location.

20. The electronic entity as claimed in claim 19, wherein the at least one processor is configured to read data in the first area, and
the electronic entity further comprises a locking mechanism configured to selectively lock the operation of the electronic entity according to the read data.

* * * * *